United States Patent
Stephens et al.

(10) Patent No.: US 11,042,378 B2
(45) Date of Patent: Jun. 22, 2021

(54) PROPAGATION INSTRUCTION TO GENERATE A SET OF PREDICATE FLAGS BASED ON PREVIOUS AND CURRENT PREDICTION DATA

(71) Applicant: ARM LIMITED, Cambridge (GB)

(72) Inventors: Nigel John Stephens, Cambridge (GB); Mbou Eyole, Soham (GB); Alejandro Martinez Vicente, Cambridge (GB)

(73) Assignee: ARM Limited, Cambridge (GB)

( * ) Notice: Subject to any disclaimer, the term of this patent is extended or adjusted under 35 U.S.C. 154(b) by 80 days.

(21) Appl. No.: 15/743,735

(22) PCT Filed: Jul. 28, 2016

(86) PCT No.: PCT/GB2016/052309
§ 371 (c)(1),
(2) Date: Jan. 11, 2018

(87) PCT Pub. No.: WO2017/021697
PCT Pub. Date: Feb. 9, 2017

(65) Prior Publication Data
US 2018/0210731 A1  Jul. 26, 2018

(30) Foreign Application Priority Data

Jul. 31, 2015 (GB) ..................................... 1513507

(51) Int. Cl.
*G06F 9/30* (2018.01)
*G06F 9/32* (2018.01)

(52) U.S. Cl.
CPC ........ *G06F 9/3016* (2013.01); *G06F 9/30018* (2013.01); *G06F 9/30036* (2013.01);
(Continued)

(58) Field of Classification Search
CPC .......................... G06F 9/30065; G06F 9/30094
See application file for complete search history.

(56) References Cited

U.S. PATENT DOCUMENTS

| 2010/0049951 A1 | 2/2010 | Gonion et al. |
| 2011/0113217 A1* | 5/2011 | Gonion ................. G06F 8/4441 |
| | | 712/7 |

(Continued)

FOREIGN PATENT DOCUMENTS

| TW | 201335845 | 9/2013 |
| TW | 201344566 | 11/2013 |

OTHER PUBLICATIONS

International Search Report and Written Opinion of the ISA for PCT/GB2016/052309, dated Oct. 10, 2016, 10 pages.
(Continued)

*Primary Examiner* — Jacob Petranek
(74) *Attorney, Agent, or Firm* — Nixon & Vanderhye P.C.

(57) ABSTRACT

Data processing apparatus comprises processing circuitry to selectively apply a vector processing operation to data items at positions within data vectors according to the states of a set of respective predicate flags associated with the positions, the data vectors having a data vector processing order, each data vector comprising a plurality of data items having a data item order, the processing circuitry comprising: instruction decoder circuitry to decode program instructions; and instruction processing circuitry to execute instructions decoded by the instruction decoder circuitry; wherein the instruction decoder circuitry is responsive to a propagation instruction to control the instruction processing circuitry to derive a set of predicate flags applicable to a current data vector in dependence upon a set of predicate flags applicable to a preceding data vector in the data vector processing order, wherein when one or more last-most predicate flags of the set applicable to the preceding data vector are inactive, all of the derived predicate flags in the set applicable to the current data vector are inactive.

12 Claims, 9 Drawing Sheets

(52) U.S. Cl.
CPC ...... *G06F 9/30072* (2013.01); *G06F 9/30076* (2013.01); *G06F 9/30094* (2013.01); *G06F 9/325* (2013.01)

(56) References Cited

U.S. PATENT DOCUMENTS

| | | |
|---|---|---|
| 2012/0102301 A1 | 4/2012 | Gonion |
| 2014/0115301 A1 | 4/2014 | Sanghai et al. |
| 2014/0115302 A1 | 4/2014 | Higham et al. |
| 2014/0289496 A1 | 9/2014 | Gonion |
| 2015/0089187 A1 | 3/2015 | Gonion |
| 2015/0154024 A1 | 6/2015 | Anderson et al. |
| 2016/0092398 A1* | 3/2016 | Gonion ............... G06F 9/30036 712/7 |

OTHER PUBLICATIONS

Search Report for GB1513507.2, dated Feb. 25, 2016, 4 pages.
Examination Report for GB1513507.2, dated May 17, 2017, 2 pages.
Office Action for TW Application No. 105124011 dated Jul. 21, 2020 and English translation, 13 pages.
Office Action for JP Application No. 2018-503598 dated Sep. 11, 2020 and English summary, 3 pages.
Office Action for EP Application No. 16747574.8 dated Feb. 19, 2021, 7 pages.
Office Action for IN Application No. 201817004961 dated Feb. 26, 2021, 6 pages.

\* cited by examiner

US 11,042,378 B2

PROPAGATION INSTRUCTION TO GENERATE A SET OF PREDICATE FLAGS BASED ON PREVIOUS AND CURRENT PREDICTION DATA

This application is the U.S. national phase of International Application No. PCT/GB2016/052309 filed 28 Jul. 2016, which designated the U.S. and claims priority to GB Patent Application No. 1513507.2 filed 31 Jul. 2015, the entire contents of each of which are hereby incorporated by reference.

BACKGROUND

This disclosure relates to data processing apparatus and methods.

Some data processing arrangements allow for vector processing operations, involving applying a single vector processing instruction to data items of a data vector having a plurality of data items at respective positions in the data vector. By contrast, scalar processing operates on, effectively, single data items rather than on data vectors.

Vector processing can be useful in instances where processing operations are carried out on many different instances of the data to be processed. In a vector processing arrangement, a single instruction can be applied to multiple data items (of a data vector) at the same time. This can improve the efficiency and throughput of data processing compared to scalar processing.

SUMMARY

In an example arrangement there is provided a data processing apparatus comprising:

processing circuitry to selectively apply a vector processing operation to data items at positions within data vectors according to the states of a set of respective predicate flags associated with the positions, the data vectors having a data vector processing order, each data vector comprising a plurality of data items having a data item order, the processing circuitry comprising:

instruction decoder circuitry to decode program instructions; and instruction processing circuitry to execute instructions decoded by the instruction decoder circuitry;

wherein the instruction decoder circuitry is responsive to a propagation instruction to control the instruction processing circuitry to derive a set of predicate flags applicable to a current data vector in dependence upon a set of predicate flags applicable to a preceding data vector in the data vector processing order, wherein when one or more last-most predicate flags of the set applicable to the preceding data vector are inactive, all of the derived predicate flags in the set applicable to the current data vector are inactive.

In another example arrangement there is provided a data processing apparatus comprising:

means for selectively applying a vector processing operation to data items at positions within data vectors according to the states of a set of respective predicate flags associated with the positions, the data vectors having a data vector processing order, each data vector comprising a plurality of data items having a data item order, the means for applying comprising:

means for decoding program instructions; and
means for executing instructions decoded by the means for decoding;

the means for decoding being responsive to a propagation instruction to control the means for executing to derive a set of predicate flags applicable to a current data vector in dependence upon a set of predicate flags applicable to a preceding data vector in the data vector processing order, wherein when one or more last-most predicate flags of the set applicable to the preceding data vector are inactive, all of the derived predicate flags in the set applicable to the current data vector are inactive.

In another example arrangement there is provided a data processing method comprising selectively applying a vector processing operation to data items at positions within data vectors according to the states of a set of respective predicate flags associated with the positions, the data vectors having a data vector processing order, each data vector comprising a plurality of data items having a data item order, the applying comprising:

decoding program instructions; and
executing instructions decoded by the decoding step;

the decoding step being responsive to a propagation instruction to control the executing step to derive a set of predicate flags applicable to a current data vector in dependence upon a set of predicate flags applicable to a preceding data vector in the data vector processing order, wherein when one or more last-most predicate flags of the set applicable to the preceding data vector are inactive, all of the derived predicate flags in the set applicable to the current data vector are inactive.

In another example arrangement there is provided a virtual machine comprising a data processor to execute a computer program comprising machine readable instructions, in which execution of the computer program causes the data processor to operate as a data processing apparatus comprising:

processing circuitry to selectively apply a vector processing operation to data items at positions within data vectors according to the states of a set of respective predicate flags associated with the positions, the data vectors having a data vector processing order, each data vector comprising a plurality of data items having a data item order, the processing circuitry comprising:

instruction decoder circuitry to decode program instructions; and instruction processing circuitry to execute instructions decoded by the instruction decoder circuitry;

wherein the instruction decoder circuitry is responsive to a propagation instruction to control the instruction processing circuitry to derive a set of predicate flags applicable to a current data vector in dependence upon a set of predicate flags applicable to a preceding data vector in the data vector processing order, wherein when one or more last-most predicate flags of the set applicable to the preceding data vector are inactive, all of the derived predicate flags in the set applicable to the current data vector are inactive.

BRIEF DESCRIPTION OF THE DRAWINGS

The present technique will be described further, by way of example only, with reference to embodiments thereof as illustrated in the accompanying drawings, in which.

DESCRIPTION OF EMBODIMENTS

Figure 1:
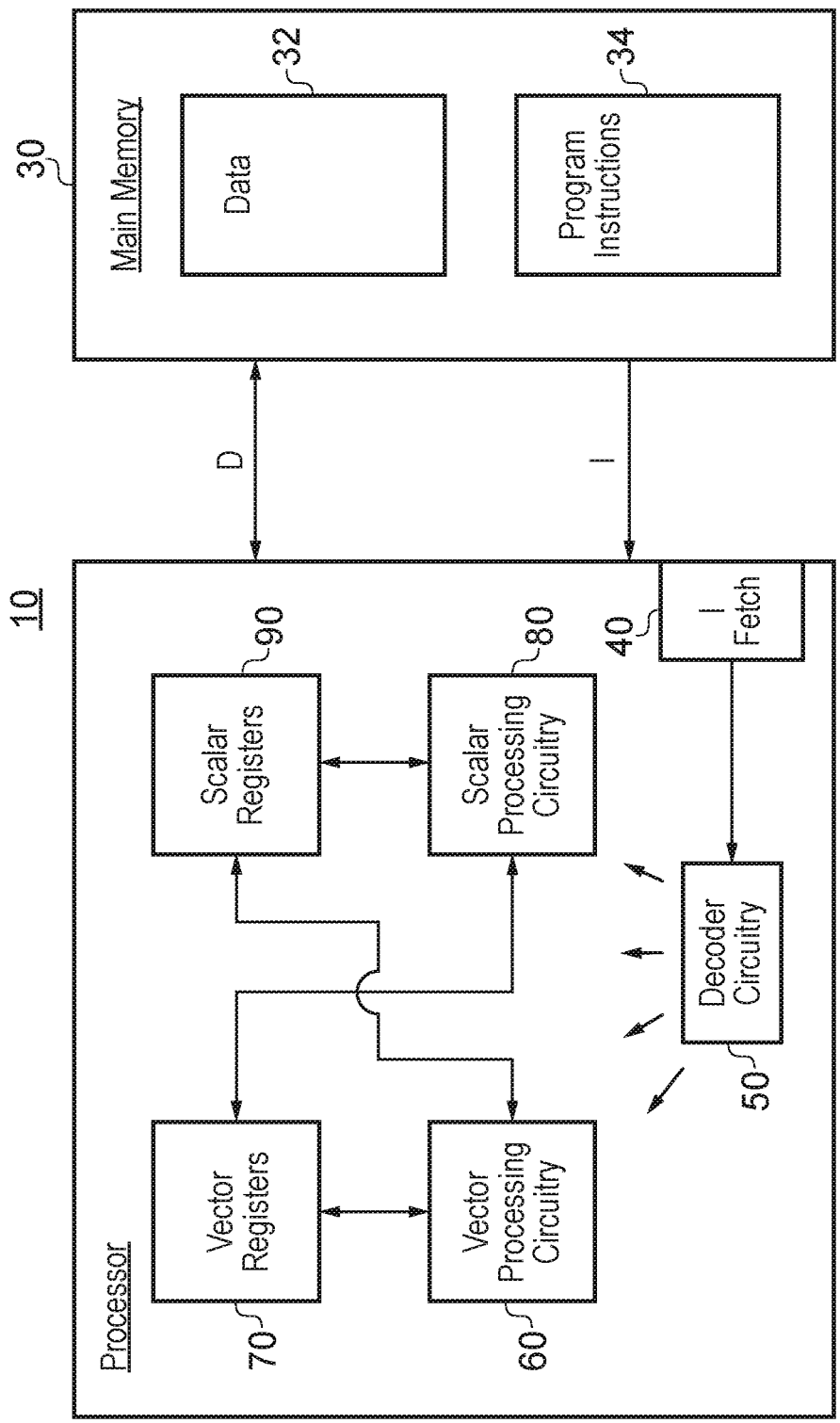
FIG. 1 schematically illustrates a data processing apparatus.

Before discussing the embodiments with reference to the accompanying figures, the following description of embodiments is provided.

An example embodiment provides a data processing apparatus comprising:

processing circuitry to selectively apply a vector processing operation to data items at positions within data vectors according to the states of a set of respective predicate flags associated with the positions, the data vectors having a data vector processing order, each data vector comprising a plurality of data items having a data item order, the processing circuitry comprising:

instruction decoder circuitry to decode program instructions; and instruction processing circuitry to execute instructions decoded by the instruction decoder circuitry;

wherein the instruction decoder circuitry is responsive to a propagation instruction to control the instruction processing circuitry to derive a set of predicate flags applicable to a current data vector in dependence upon a set of predicate flags applicable to a preceding data vector in the data vector processing order, wherein when one or more last-most predicate flags of the set applicable to the preceding data vector are inactive, all of the derived predicate flags in the set applicable to the current data vector are inactive.

Example embodiments can be useful in instances where multiple data vectors are to be processed, and in which a status associated with one data vector has an effect on whether an operation should be carried out on a next data vector. The propagation instruction can derive a set of predicate flags from those applicable to a preceding vector. An example situation can occur in the case of an "unrolled" loop operation (in which multiple data vectors are handled at a single loop iteration), though the arrangement is also applicable to other situations. If a loop break condition is detected in respect of one data vector it can be handed for that one data vector by the use of predicate flags. The propagation instruction can provide a way of propagating that result to subsequent data vectors in the same loop iteration.

In example embodiments, the instruction decoder circuitry is responsive to the propagation instruction to control the instruction processing circuitry to respond to initial states of the set of predicate flags applicable to the current data vector, wherein when one or more last-most predicate flags of the set applicable to the preceding data vector are active, the derived predicate flags in the set applicable to the current data vector are derived from their respective initial states.

In example embodiments the instruction decoder circuitry is responsive to the propagation instruction to control the instruction processing circuitry to respond to a further set of predicate flags defining which of the predicate flags associated with the preceding data vector are applicable to that preceding data vector.

The predicates to be propagated (or not) can themselves be derived by the propagation instruction, in example embodiments in which the instruction decoder circuitry is responsive to the propagation instruction to control the instruction processing circuitry to generate the initial states of the set of predicate flags applicable to the current data vector from a data set having a data set entry corresponding to each predicate flag. In example embodiments, each data set entry has multiple possible states; and the instruction decoder circuitry is responsive to the propagation instruction to control the instruction processing circuitry to generate the initial states of the set of predicate flags applicable to the current data vector, wherein the predicate flags are set to an active state up to a predicate flag immediately preceding a first occurrence, in the data item order, of a particular state of the corresponding data set entry. For example, the processing circuitry may be configured to generate the data set as an output of a vector processing operation such as a compare operation.

In example embodiments the propagated predicates can be used as part of a loop break control, in which the processing circuitry is configured to execute a looped operation and to generate the data set as a test of continued execution of the looped operation; and the processing circuitry is configured to terminate the looped operation if one or more last-most predicate flags of the set applicable to the current data vector are inactive.

In example embodiments, an active predicate flag indicates that the vector processing instruction should be applied, and an inactive predicate flag indicates that the vector processing instruction should not be applied.

An example embodiment provides a data processing apparatus comprising:

means for selectively applying a vector processing operation to data items at positions within data vectors according to the states of a set of respective predicate flags associated with the positions, the data vectors having a data vector processing order, each data vector comprising a plurality of data items having a data item order, the means for applying comprising:

means for decoding program instructions; and means for executing instructions decoded by the means for decoding;

the means for decoding being responsive to a propagation instruction to control the means for executing to derive a set of predicate flags applicable to a current data vector in dependence upon a set of predicate flags applicable to a preceding data vector in the data vector processing order, wherein when one or more last-most predicate flags of the set applicable to the preceding data vector are inactive, all of the derived predicate flags in the set applicable to the current data vector are inactive.

An example embodiment provides a data processing method comprising selectively applying a vector processing operation to data items at positions within data vectors according to the states of a set of respective predicate flags associated with the positions, the data vectors having a data vector processing order, each data vector comprising a plurality of data items having a data item order, the applying comprising:

decoding program instructions; and executing instructions decoded by the decoding step;

the decoding step being responsive to a propagation instruction to control the executing step to derive a set of predicate flags applicable to a current data vector in dependence upon a set of predicate flags applicable to a preceding data vector in the data vector processing order, wherein when one or more last-most predicate flags of the set applicable to the preceding data vector are inactive, all of the derived predicate flags in the set applicable to the current data vector are inactive.

An example embodiment provides a virtual machine comprising a data processor to execute a computer program comprising machine readable instructions, in which execution of the computer program causes the data processor to operate as a data processing apparatus comprising:

processing circuitry to selectively apply a vector processing operation to data items at positions within data vectors according to the states of a set of respective predicate flags associated with the positions, the data vectors having a data vector processing order, each data vector comprising a plurality of data items having a data item order, the processing circuitry comprising:

instruction decoder circuitry to decode program instructions; and instruction processing circuitry to execute instructions decoded by the instruction decoder circuitry;

wherein the instruction decoder circuitry is responsive to a propagation instruction to control the instruction processing circuitry to derive a set of predicate flags applicable to a current data vector in dependence upon a set of predicate flags applicable to a preceding data vector in the data vector processing order, wherein when one or more last-most predicate flags of the set applicable to the preceding data vector are inactive, all of the derived predicate flags in the set applicable to the current data vector are inactive.

Referring now to the drawings, FIG. 1 schematically illustrates a data processing system 10 comprising a processor 20 coupled to a memory 30 storing data values 32 and program instructions 34. The processor 20 includes an instruction fetch unit 40 for fetching program instructions 34 from the memory 30 and supplying the fetch program instructions to decoder circuitry 50. The decoder circuitry 50 decodes the fetched program instructions and generates control signals to control vector processing circuitry 60 to perform vector processing operations upon vector registers stored within vector register circuitry 70 as specified by the decoded vector instructions.

The processor 20 also comprises scalar processing circuitry 80 associated with scalar registers 90.

A general distinction between scalar processing and vector processing is as follows. Vector processing involves applying a single vector processing instruction to data items of a data vector having a plurality of data items at respective positions in the data vector. Scalar processing operates on, effectively, single data items rather than on data vectors.

Vector processing can be useful in instances where processing operations are carried out on many different instances of the data to be processed. In a vector processing arrangement, a single instruction can be applied to multiple data items (of a data vector) at the same time. This can improve the efficiency and throughput of data processing compared to scalar processing.

The discussion below relates to example program instructions 34. Embodiments of the present disclosure include an apparatus, for example of the type shown in FIG. 1, operable or configured to decode and execute such program instructions. FIG. 1 therefore provides an example of processing circuitry to selectively apply a vector processing operation to data items at positions within data vectors according to the states of a set or respective predicate flags (discussed below) associated with the positions, the data vectors having a data vector processing order, each data vector comprising a plurality of data items having a data item order, the processing circuitry comprising instruction decoder circuitry to decode program instructions; and instruction processing circuitry to execute instructions decoded by the instruction decoder circuitry; wherein the instruction decoder circuitry is responsive to instructions to control the instruction processing circuitry to carry out functionality to be discussed below.

Figure 2:
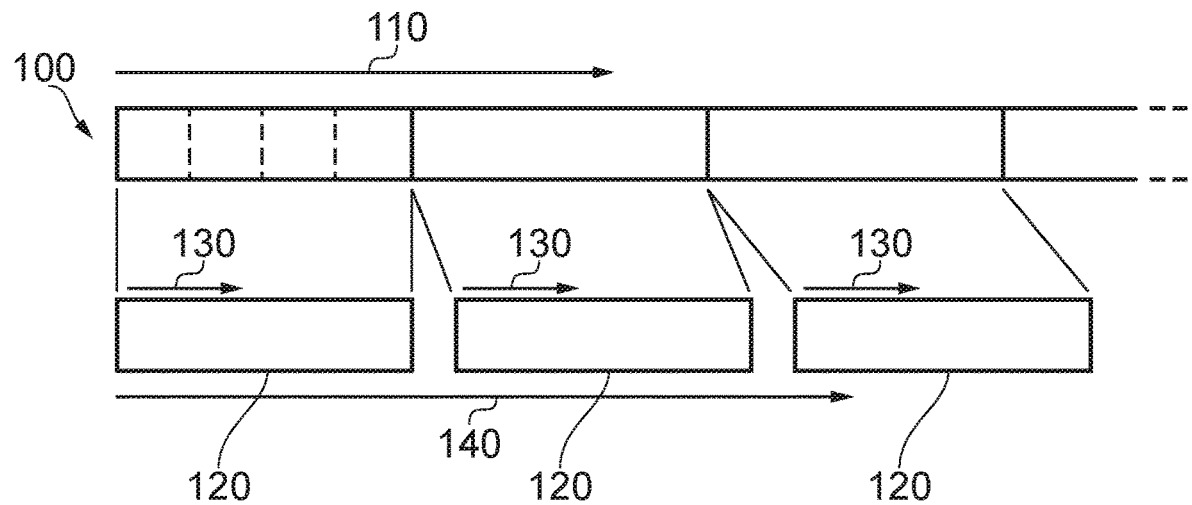
FIG. 2 schematically illustrates the handling of data as multiple data vectors.

FIG. 2 schematically illustrates the handling of data as multiple data vectors. In this arrangement, a set of data items 100 are intended to be processed in a processing order 110. The data items 100 are in fact handled as successive data vectors 120 so that in a vector processing operation, a single vector processing instruction is applied to all of the data items in the data vector (for example, 4 data items, 8 data items or whatever the vector length of the particular system is) simultaneously.

Having said this, each data vector 120 retains a data item processing order 130, and from vector to vector there is a vector processing order 140, so that if any reference is needed during processing to the original processing order 110, this can be achieved by considering the data vectors in the vector processing order 140 and considering data items within each data vector in the data item processing order 130. This consideration is relevant (at least) to the termination of loop processing, as discussed below.

Figure 3:
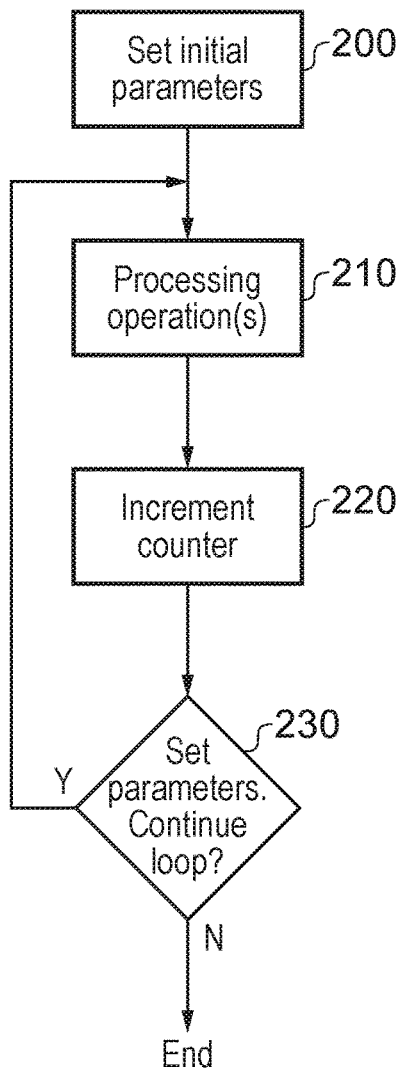
FIG. 3 is a schematic flowchart illustrating a looped operation.

FIG. 3 is a schematic flow chart illustrating a looped operation in a vector processing arrangement. At a step 200, initial parameters are established. A simple example here is that a loop control variable is set to an initial value such as 0, for example by an operation of the scalar processing circuitry 80.

At a step 210, one or more processing operations are carried out in respect of a current data vector. The current data vector may be, for example, defined with respect to a contiguous block of data 32 stored in the memory as follows:

VectorA=Data [SA+i . . . SA+i+$V_L$−1]

where the variable i is the loop control variable, the variable SA is a starting address of the contiguous block of data and the variable $V_L$ is the vector length applicable to the particular processing system in use. In other words, in this example, a contiguous group of data items between the address (SA+i) and the address (SA+i+$V_L$−1) inclusive form the $V_L$ data items of the vector VectorA.

In other examples, a so-called gathered data vector may be used, where a set of pointers to two or more non-contiguous locations in memory are provided in order to populate the data vector. Similarly, at the time of writing a data vector back to main memory, a so-called scatter process can be used so that data items are written back to non-contiguous memory locations. Such arrangements do not otherwise affect the way in which the processes described here operate, and so for the purposes of the present description a continuous data set (whether contiguously stored or not) will be assumed. It is noted however that the use of inactive predicate flags (discussed below) to avoid unnecessary gather or scatter operations from or to main memory can reduce the processing overhead of a vector processing operation.

Various different types of vector processing operation(s) can be carried out at the step 210. For example, a vector processing operation may be carried out with respect to data items of VectorA so as to generate results which are stored as data items of a second data vector, VectorB.

At a step 220, the counter or loop control variable is incremented so as to move the loop operation forward. Here, the term "increment" does not refer only to an increase by 1 but could refer to an increase by another value. Indeed, in the present example the loop control variable is incremented by the vector length $V_L$ as represented by the number of predicate flags, as determined by the processing circuitry for example.

At a step 230 the system detects whether to continue the loop operation, or in other words, whether the loop control variable has reached an ending point defined for that loop. If the loop operation should be continued then control returns to the step 210. Other parameters are also set at the step 220 and examples of this part of the process will be discussed below. Otherwise, the process ends.

A decision on whether to continue the loop operation can be taken in the form of a conditional jump, branch or other instruction which changes the program flow (for example, back to the step 210), where a condition can be indicated, for example, but one or more processor condition flags (for example, the N, Z, C and V flags) based on execution of an instruction such as a WHILE instruction to be discussed below. Accordingly, the WHILE instruction has the effect of setting one or more condition flags to control whether a separate (conditional branch or jump) instruction actually changes the program flow to continue the loop or not. (But in other examples, it is envisaged that the WHILE instruction could also perform the jump or branch as well).

In the case of program instructions intended for execution by different instances of vector processing circuitry (without a recompilation process) where those different instances may have different available vector lengths $V_L$, it can be useful to provide arrangements for controlling looped operations which operate according to whatever is the available length $V_L$ of the vector processing circuitry by which the instructions are being executed. (An alternative, which would be to fix a notional $V_L$ at the smallest level which may be encountered amongst the different instances of vector processing circuitries, could be inefficient by not making use of larger vector lengths available with some instances.) In example arrangements discussed here, rather than using scalar operations to control loop operation, predicate flags (discussed below) are used.

Figure 4:
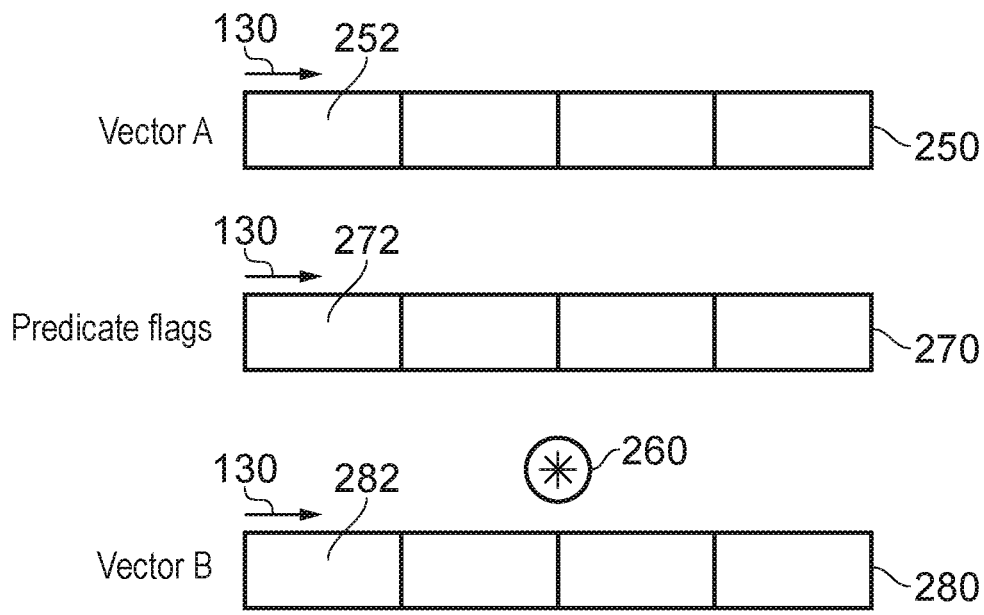
FIG. 4 schematically illustrates the use of predicate flags.

FIG. 4 schematically illustrates the use of predicate flags to control vector processing operations.

There can be instances where a single vector processing operation should be applied differently to different data items within a data vector. The vector processing circuitry 60 provides for this by the use of so-called predicate flags. Predicate flags comprise flag information provided for each data item position within a data vector to indicate whether a processing operation should be carried out in respect of that data item position. In examples, the vector processing circuitry 60 can access multiple sets of predicate flags, such that any particular vector processing operation can refer to one or more sets of predicate flags as parameters to that vector processing operation.

Referring to FIG. 4, an example arrangement uses data vectors comprising four data items ($V_L$=4) but it will be appreciated that these arrangements can apply to different vector lengths. An example input data vector 250 (VectorA) is to be the subject of a vector processing operation 260 such that, in the absence of any control by predicate flags, the vector processing operation 260 would be applied to each data item position. However, a set of predicate flags 270, one for each data item position or "lane", is also provided to control the vector processing operation.

The data items 252 of the input vector (vector A) are processed according to the vector processing operation 260 to generate data items 282 of an output data vector 280 (vector B). If the predicate flag 272 corresponding to a data item position in the output data vector 280 is set to "active" (for example, a value of 1). If the corresponding predicate flag for an output vector position is set to "inactive" (for example, a value of 0) then the vector processing operation 260 in respect of that output vector position is not carried out.

As discussed above, in the present examples the predicate flags control whether a vector processing operation for a particular output position or "lane" in relation to the output data vector 280 is carried out. However, in other examples, predicate flags could be used to control whether data item positions in the input vector (or one or more input vectors) 250 are used.

This therefore provides an example of the predicate flags having an active state indicating that the vector processing instruction should be applied to those positions of a data vector corresponding to predicate flags in the active state. An inactive state indicates that the vector processing operation should not be so applied.

If a vector processing operation is not carried out in respect of a particular output vector position 282, because of an inactive predicate flag, then in some examples a fixed value such as 0 can be inserted into that output position. In other examples the previous contents, whatever they are, of that output position can be left unchanged.

The use of predicate flags in this manner therefore provides an example of applying a vector processing instruction to one or more data items of a data vector comprising a plurality of data items at respective positions in the data vector, according to the state of respective predicate flags associated with the positions.

Figure 5:
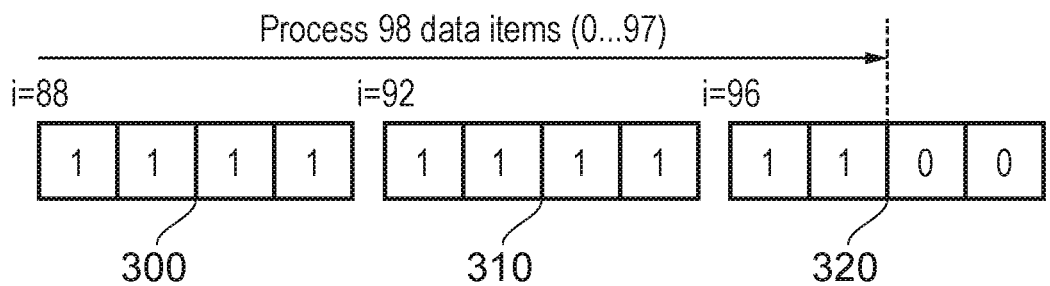
FIG. 5 schematically illustrates the control of predicate flags according to a counter variable.
Figure 6:
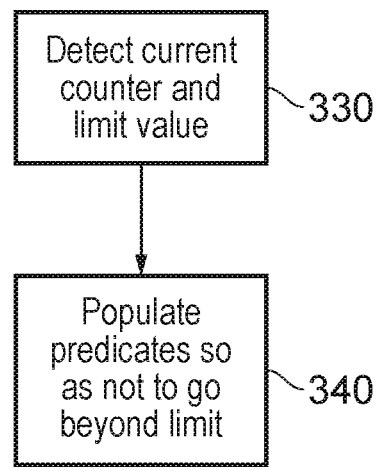
FIG. 6 is a schematic flowchart illustrating the setting of predicate flags by a "WHILE" instruction according to a counter variable.

The present examples allow for the use of predicate flags in the control of a looped operation such as that shown schematically in FIG. 3. FIGS. 5 and 6 will be used to explain aspects of this type of operation.

A feature of a looped operation is that a number of data items are handled in a data item processing order under the control of a loop control variable, until the loop control variable reaches a particular upper limit, at which point the loop terminates at the step 230 of FIG. 3. An example of a scalar processing loop is provided by the following schematic pseudo code:

For i=0 to 97
Process Data [i]
Next i

Here, the looped operation starts with the loop control variable i set to 0 and continues until the loop control variable i reaches the value of 97. In other words, in total, 98 data items are handled.

The loop operation can instead be performed using vector processing as discussed with reference to FIG. 3, so that the data items are handled one vector at a time. This can provide efficiencies by allowing groups of multiple data items to be handled by a single vector processing instruction.

For example, in the case of a system in which the vector length $V_L$ is 4, so each data vector contains four data items, the first 96 data items in the loop operation can be handled by just 24 (=96/4) vector processing operations. However, if a full 25$^{th}$ vector of four data items were to be processed, this would take the number of process data items to 100, which is in excess of the required loop operation.

Instead, the final vector processing operation should operate only with respect to the 97$^{th}$ and 98$^{th}$ data items (in the processing order 110) and not in respect of the 99$^{th}$ and 100$^{th}$ data items in the processing order 110.

Example embodiments provide a "WHILE" instruction to control the vector processing circuitry 60 to apply a vector processing instruction to one or more data items of a data vector defined at least in part by a control variable such as a loop control variable. The WHILE instruction is responsive to the control variable so as to select one or more of the predicate flags for setting to the active state so that the number of data items processed does not exceed the upper loop limit.

An example of the use of this arrangement is shown FIG. 5 which schematically illustrates the last three data vectors to be handled in the example loop operation discussed above, where (purely for the purposes of this example) 98 data items are to be processed, and $V_L=4$.

As discussed above, in the example loop of 98 data items, the data items are handled a data vector at a time, and given that the data vector length $V_L$ in this example is 4 data items, the loop counter will start from 0 and advance in units of $V_L$ (0, 4, 8, 12 . . . ). The situation in respect of the last three instances of the loop counter advancing in this way is shown schematically in FIG. 5, namely those at which the loop counter is set to 88, 92 and then 96. The predicate flags 300, 310, 320 applicable to each of these situations are illustrated where a logical value of 1 indicates "active" and logical value of 0 indicates "inactive". The predicate flags are set by the "WHILE" instruction according to a predetermined ordering of the predicate flags, which corresponds to the data item processing order 130 of each data vector.

When i=88, the WHILE instruction detects that all four predicate flags can be set to 1 (active) and the total number of data items processed as a result of setting those predicate flags is to 1 will still be less than the upper loop limit of 97. Similarly, when i is advanced to 92, the WHILE instruction detects that all four predicate flags 310 can be set to 1 and still, at the end of processing that data vector, the number (96) of data items processed will still be less than the total required number of 98.

At the third instance shown in FIG. 5, the loop control variable i is set to 96. The "WHILE" instruction detects that in order to comply with the upper loop limit of 97, there are only two data items to be processed in this, final, vector processing operation of the loop. The WHILE instruction therefore sets the first two predicate flags (in the processing order 130) to 1 and the other two predicate flags (in the order 130) to 0, so that the processing operations at the step 210 can be carried out according to those predicate flags and still not exceed the total number of operations defined by the upper limit of the loop control variable i.

As part of its operation, the WHILE instruction also provides at least a part of the functionality of the step 230 and sets one or more condition flags to control the passing of control back to the step 210 of FIG. 3 as long as there are still processing operations to be carried out, which is to say that the value of i passed to the WHILE instruction at the step 220 is less than the upper loop control variable limit (97 in this example).

This therefore provides an example of the WHILE instruction, when executed, selects one or more of the predicate flags for setting to the active state so that a value of the control variable, taking into account the number of predicate flags selected for setting to the active state, does not breach the arithmetic condition. Here, "taking into account" could mean, in the case of an incrementing counter, adding to the current counter value, and in the case of a decrementing counter, subtracting from the current counter value. The one or more of the predicate flags for setting to the active state can be selected according to a predetermined ordering of the predicate flags, for example the order 130.

FIG. 6 is a schematic flow chart representing the setting of predicate flags by a WHILE instruction according to a counter variable.

In FIG. 6, at a step 330 the WHILE instruction detects the current counter (loop control variable) value and the limit value (i and 97 respectively in the present examples). At a step 340, the WHILE instruction populates the predicate flags so that a value of the loop control variable, plus (in this example) the number of predicate flags selected for setting to the active state, does not breach the upper limit of the loop control variable.

Of course, it will be appreciated that in other examples a loop control variable could count down instead of up, in which case the limit value would be a lower limit value rather than an upper limit value. Similarly, the arithmetic test applied at the step 340 by the WHILE instruction would be a test as to whether the control variable was greater than the lower limit value. It will also be appreciated that a "less than or equal to" or a "greater than or equal to" test can be applied, for example so that the looped operation terminates one instance short of the limit value. In general, the arithmetic condition applied by the WHILE instruction can be a condition selected from the list consisting of:

the control variable being less than an upper limit value;
the control variable being greater than a lower limit value;
the control variable being less than or equal to an upper limit value; and
the control variable being greater than or equal to an lower limit value.

Figure 7:
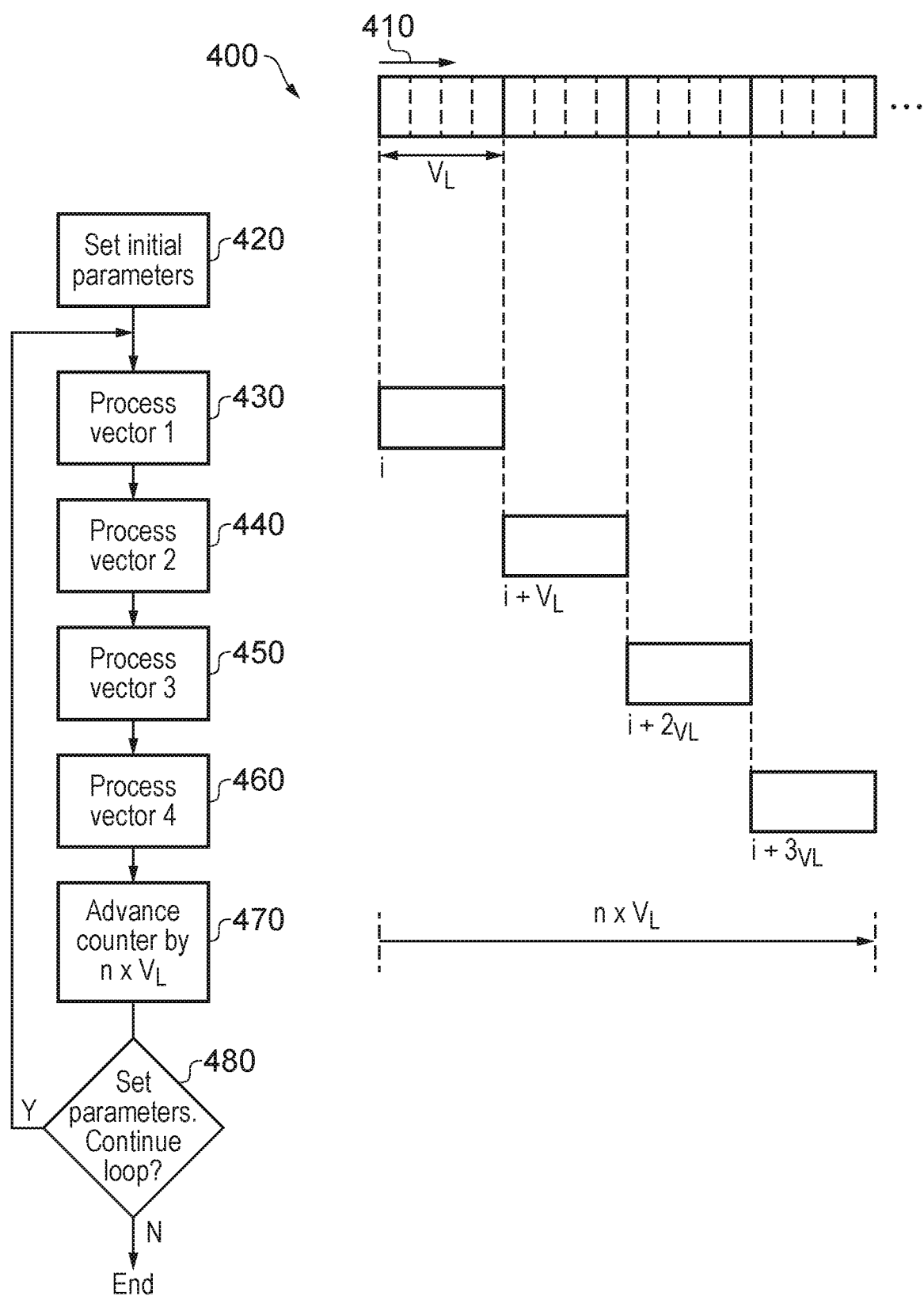
FIG. 7 schematically illustrates a so-called unrolled loop.

FIG. 7 schematically illustrates a so-called "unrolled" loop.

In the absence of unrolling, each iteration of a looped operation carries out a single data vector's worth of processing. The loop then advances to a next loop position and a next data vector's worth of processing is carried and so on.

"Unrolling" a loop involves processing multiple successive data vectors within a single loop iteration. Loop unrolling is carried out, for example, in order to improve efficiency, in that the processing overheads involved in initiating and terminating each iteration of the loop are then shared between the processing of multiple data vectors.

In FIG. 7, data 400 to be processed, having a data processing order 410, is arranged for the purposes of the loop processing into multiple data vectors each having a vector length $V_L$. In the example shown, $V_L$ is equal to 4 but of course different values could be used according to the parameters of the vector processing circuitry 60 in use.

The operations are similar to those described with reference to FIG. 3, except that multiple data vectors are processed at each loop iteration. Accordingly, at a step 420, initial parameters are set in a similar manner to the step 200 of FIG. 3. For example, a loop control variable or counter is initialised to 0. Then, at step 430, 440, 450 and 460, multiple successive data vectors are subjected to the same processing. The step 430 involves processing a data vector having a starting position within the data 400 defined by the loop control variable i. The step 440 applies the same processing, but to a data vector having a starting position in the data 400 defined by i+$V_L$, and so on. It will be appreciated that the number of data vectors processed in each iteration of the loop can be any number greater than or equal to 2, and the use of 4 data vectors in this example is merely for the purposes of this explanation. At a step 470, the loop control variable i is advanced by n×$V_L$, where n is the number of data vectors processed at each iteration of the unrolled loop. At a step 480, the WHILE instruction sets parameters (the predicate flags as discussed in connection with FIGS. 5 and 6) and detects whether to set one or more condition flags so as to continue the loop or not continue the loop. If the loop is continued, control passes to the step 430 again (for example, by the WHILE instruction setting a flag such as a condition flag, and a conditional jump or branch instruction responding to that condition), and if not the process follows an end procedure.

The flowcharts of FIGS. 3 and 7, read in conjunction with the description of FIGS. 5 and 6, provides an example of decoding (for example, by the decoder circuitry 50): a WHILE instruction (as discussed, at the steps 230, 480) to control a vector processor to apply a vector processing instruction to one or more data items of a data vector defined at least in part by a control variable, the data vector comprising a plurality of data items at respective positions in the data vector, according to the state of respective predicate flags associated with the positions, while an arithmetic condition applies to the control variable; and a CHANGE instruction to change (for example, at the step 220 or the step 470) the value of the control variable by an amount dependent upon a number of the predicate flags which are currently set to a particular state, the CHANGE instruction having an associated saturation value, so that execution of the CHANGE instruction changing the value of the control variable no further than the saturation value; and executing (for example, by the vector processing circuitry 60 and/or the scalar processing circuitry 80) instructions decoded by the instruction decoder.

The steps 230, 480 provide an example of the WHILE instruction, when executed, causes the processor to continues iteratively executing a processing loop while an arithmetic condition applies to the control variable, for example by setting one or more condition flags as discussed above.

Figure 8:
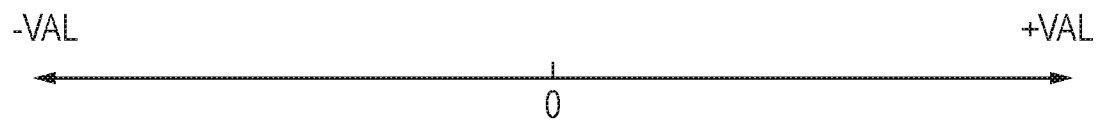
FIGS. 8 and 9 schematically illustrate values representable by a counter variable.
Figure 9:

FIGS. 8 and 9 schematically illustrate values representable by a counter variable. In the case of FIG. 8, the counter variable is a signed variable so that values between a lower limit of −VAL and an upper limit of +VAL are representable. In the case of FIG. 9, the counter variable is unsigned so that values between 0 and an upper limit of +VAL are representable. Note that in the case of FIG. 8, the upper and lower limits could have different magnitudes so that a lower limit is −$VAL_1$ and an upper limit is +$VAL_2$, where |$VAL_1$| and |$VAL_2$| are different (where |x| represents the modulus or magnitude of x). For example, in an 8-bit signed two's complement representation, −$VAL_1$ might be −127 and +$VAL_2$ might be +128. Similarly, the upper limit of +VAL in FIG. 9 is not necessarily the same as the upper limit of +VAL in FIG. 8. But in either instance, the principle being illustrated is that a property of the counter variable can be indicated by the lower and upper limits of the values it can represent.

Figures 10, 11:
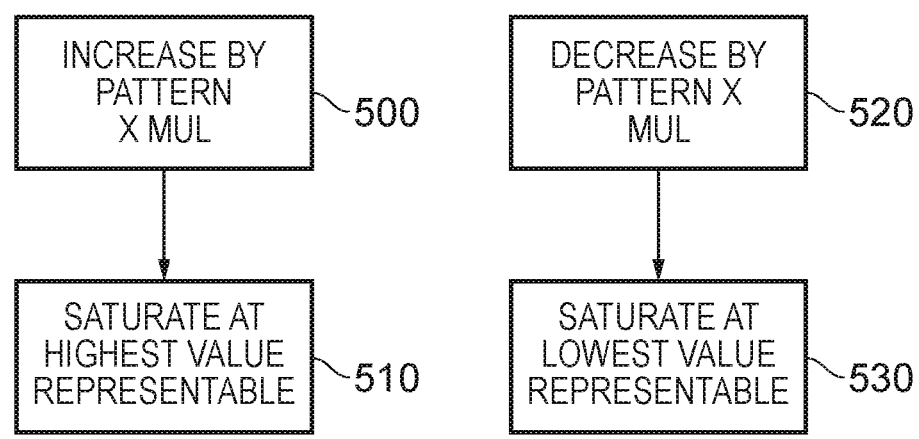
FIGS. 10 and 11 are schematic flowcharts illustrating the operation of increment and decrement instructions, respectively.

FIGS. 10 and 11 are schematic flow charts illustrating the operation of increment and decrement instructions, respectively.

Referring to FIG. 10, at a step 500 the increment instruction increases a variable such as a loop control variable by an amount dependent upon a pattern (to be described further below) multiplied by a factor MUL, where in examples of the use of such an instruction in a step such as the step 470 of an unrolled loop, the value MUL can be set to the number of successive data vectors processed in one iteration of the loop.

At a step 510, the increment instruction saturates at the highest value representable by the variable. The saturation step relates to the following. If the result of the step 500 is still less than the highest value (such as +VAL) representable by that variable, then the output of the step 500 is returned as the result of the increment instruction. If, on the other hand, the output of the step 500 would be in excess of the highest value representable by that variable, such that (for example) the variable would wrap round (exceed the number of bits available for that variable) or restart from the other extreme representable value, then the step 510 saturates or caps the increase so as not to reach but not to exceed the highest representable value (such as +VAL) as the output returned by the execution of the instruction.

The saturation (whether with the use of the MUL factor, as in the step 470, or without, as in the step 220) can be relevant in situations where a "WHILE" or similar operation or instruction is used at the step 230 or 480, to cause the continued execution of the loop if the loop control variable or counter complies with an arithmetic condition. In an example of an upward-counting counter having an upper limit, the arithmetic condition could be, for example, whether the counter value is less than (or less than or equal to) a particular limit value. If however the saturation feature were not used, a potential risk is that the counter would go beyond the maximum value representable by the counter variable and "wrap round" or restart at the lowest (or another) value representable by the counter variable. Because the counter advances in units of $V_L$, the "WHILE" arithmetic test could be (correctly) passed at one loop iteration and then, for the next such test, the counter could have wrapped round so the test would be (incorrectly) passed at a next iteration.

As a worked example, if the counter variable were maintained as a simple 8 bit unsigned value, then without the saturation feature the counter could reach a maximum count of 255 before continuing to count up from 0. Assume that MUL×$V_L$ is 8, so the counter advances in units of 8, and that the end of the loop is defined by i=253. Using a "less than" test at the step 230 or 480 would then not work, because a value of (say) the wrapped-round value (0 or close to 0) would pass the test, whereas the test ought to have been failed because the counter would pass the test at i=248, but at the next iteration i would wrap back round to 0 and so (incorrectly) pass the "less than" test again. The saturation feature would cause the counter to saturate at 255 in its final iteration, and so the counter i would (correctly) fail the "less than 253" test.

Note that the saturation value is a property of the way in which the counter variable is stored or maintained. It is not the same as the particular limit imposed on the counter variable by an instance of looped operation.

The "pattern" parameter will now be discussed. This provides a change amount dependent upon the number of available predicate flags, which in turn provides an arrangement which automatically scales according to vector length, thereby contributing to allowing the same program instructions to be executed, without necessarily requiring an intervening recompilation, by instances of vector processing circuitries having different available vector lengths.

The "change" instruction, when used in a situation such as the step 220 or 470, changes (increments or decrements) a variable by an amount dependent upon at least a multiplication factor MUL (which could be 1 or could be greater than 1, for example a value representable by a 3-bit parameter, for example 1 . . . 8). The amount of the change (increment or decrement) is also dependent upon the number of predicate flags as a representation of $V_L$ (as detected by the vector processing circuitry for example). For example, the appropriate change might be by MUL×$V_L$ if each predicate flag corresponds to a data item. But in other examples, the individual data items might be twice as large as in the first example (for example, half-words instead of bytes) so it might be that only every alternate predicate flag is being validly used. In such an instance the effective value of $V_L$ might be half as large as the number of predicate flags, in which case the change amount should be (MUL×number_of_predicate_flags/2).

The CHANGE instruction detects the number of predicate flags according to a pattern, and (after multiplying by MUL) increments or decrements the variable by that number. The pattern could be for example, a pattern of alternate predicate flags, or every fourth predicate flag, or various other patterns with a default of "all predicate flags". This arrangement provides a self-adjusting increment or decrement instruction so that the change amount depends upon the number of predicate flags available to the system on which the instruction is running. In turn, this means that the same instructions can be used on different systems with different available vector lengths, as the increment or decrement instruction will adjust to the currently available vector length.

Accordingly, this provides an example of the CHANGE instruction, when executed, changing the value of the variable by an amount dependent upon a selected subset of the number of the predicate flags, and the modifying value. Note that as mentioned, the subset could in fact be "all". The selected subset is dependent upon a parameter of the instruction, and the detection of the subset to use is part of the execution of the instruction by the same processing circuitry, arrangements or resources which execute other aspects of the instruction.

FIG. 11 is a schematic flow chart illustrating a similar operation of a decrement instruction such that at a step 520 a variable such as a loop control variable is decreased by the product (or other combination) of a pattern amount and a factor MUL, and at a step 530 the result is saturated at the lowest value representable by that variable, or in other words reaches, but is constrained from going any lower than, the lowest amount representable by that variable.

Note that the counter I can be a scalar variable and so could be handled (updated and tested) by the scalar processing circuitry 80, or could be handled as a data vector or part of a data vector, and so could be handled by the vector processing circuitry 60.

FIGS. 10 and 11 therefore provide examples of executing a "change" instruction having a modifying value (such as MUL) as an instruction parameter, the CHANGE instruction changing the value of a variable by an amount dependent upon a number of the predicate flags and dependent upon the modifying value. In examples, the modifying value can be a multiplicative value. In examples, the step between successive values of the control variable set by the CHANGE instruction can be dependent upon, such as proportional to, the modifying value. For example, successive changes or the step size could be proportional to the modifying value.

The apparatus of FIG. 1, when executing operations corresponding to those shown in the flowcharts of FIG. 10 or 11, provides an example of data processing apparatus (such as the apparatus 10) comprising: vector processing circuitry (such as the circuitry 60 operating in cooperation with the registers 70) to apply a vector processing instruction to one or more data items of a data vector comprising a plurality of data items at respective positions in the data vector, according to the state of respective predicate flags associated with the positions; an instruction decoder (such as the decoder circuitry 50) to decode a CHANGE instruction (for example, represented by the flowcharts of FIG. 10 or 11) having a modifying value (such as MUL) as an instruction parameter, the CHANGE instruction, when executed, changing the value of a variable (such as a loop control variable) by an amount dependent upon a number of the predicate flags and dependent upon the modifying value; and an instruction processor (such as the scalar processing circuitry 80 or the vector processing circuitry 60) to execute instructions decoded by the instruction decoder. For example, the CHANGE instruction, when executed, can change the value of a variable by an amount dependent upon a product of a value dependent upon the number of the predicate flags and the modifying value.

As discussed with reference to the steps 510, 530, the CHANGE instruction may have an associated saturation value, so that the CHANGE instruction, when executed, changes the value of the variable no further than the saturation value. As discussed with reference to FIGS. 8 and 9, in the case of a decrementing instruction to reduce the value of the variable, the saturation value may be a minimum value which can be represented by the variable. In the case of an incrementing instruction to increase the value of the variable, the saturation value may be a maximum value which can be represented by the variable.

When such an instruction is used in the context of, for example, the step 470 of the looped operation of FIG. 7, in which the variable is a counter variable, the vector processing circuitry applying the vector processing instruction to a data vector defined at least in part by the counter variable during one or more iterations of a processing loop, the instruction decoder can be configured to decode an instruction (for example, corresponding to the step 480) to detect whether to continue iteratively executing the processing loop in dependence upon the counter variable. Such an instruction may be, for example, a "WHILE" instruction to set conditions flags so as to control the processing circuitry to continue iteratively executing the processing loop while an arithmetic condition applies to the counter variable. Examples of the arithmetic condition include: the counter variable being less than an upper limit value; the counter variable being greater than a lower limit value; the counter variable being less than or equal to an upper limit value; and the counter variable being greater than or equal to a lower limit value.

Figure 12:
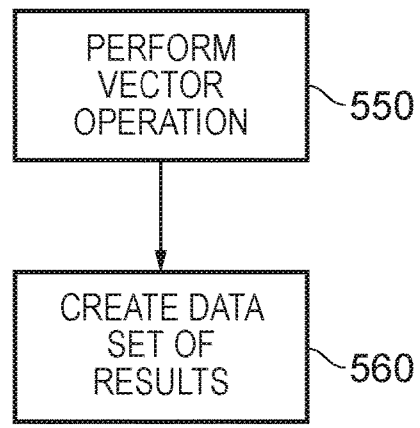
FIG. 12 is a schematic flowchart illustrating a vector operation.

FIG. 12 is a schematic flowchart illustrating a vector processing operation in which, at a step 550 a vector operation is performed, and at a step 560 a data set of results relating to the output of the vector processing operation is generated.

Purely as an example, the vector processing operation could be a comparison of each data item of a current data vector with a fixed value. If the comparison is true then a corresponding bit (at a corresponding position) in the data set of results is set to 1; otherwise, it is set to 0.

This type of operation, and the predicate flags discussed above, can be useful in another aspect of loop control, namely handling a break or exit from a loop in dependence upon the outcome of a processing operation carried out within the loop.

As discussed earlier, in at least some instances, the data 100 (FIG. 2) handled by vectorised operations can still be considered to have a data item-by-data item processing order 110. A "break condition" can be applied to the processed data items in the order 110. In a scalar system, under a break condition, processing of the loop should terminate at the first instance, in processing the loop, that the condition is detected to be true.

But if the processing is carried out in a vectorised fashion (data vector by data vector) multiple data items are processed simultaneously by a single vector processing instruction, In order to replicate the use of a break condition in a scalar loop, this means that the break condition needs to be assessed in the data item processing order 130 (FIG. 2) within each processed data vector to determine whether the loop should be terminated. Any data items which follow (in the processing order 130) the first data item to trigger the break should not be processed.

As before decision on whether to continue the loop operation can be taken in the form of a conditional jump, branch or other instruction which changes the program flow, where a condition can be indicated, for example, but one or more processor condition flags (for example, the N, Z, C and V flags) based on execution of an instruction such as a break instruction. Accordingly, the break instruction has the effect of setting one or more condition flags to control whether a separate (conditional branch or jump) instruction actually changes the program flow to continue the loop or not. (But in other examples, it is envisaged that the break instruction could also perform the jump or branch as well).

Assuming that the processing operation 550 of FIG. 12 generates a result on which a break decision is to be based, a so-called "break before" or "break after" operation can be used to set the predicate flags so as to respond to the test applied to the data set generated at the step 560. An example will now be described with reference to FIGS. 13 and 14.

Figure 13:
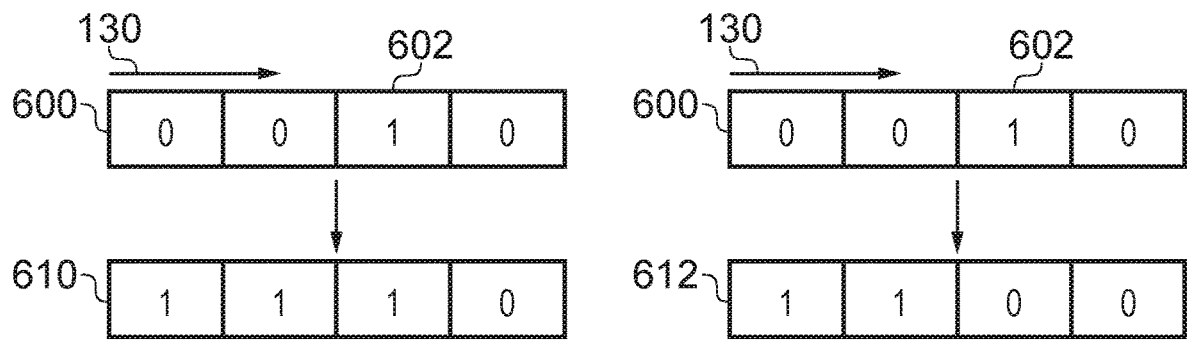
FIGS. 13 and 14 schematically illustrate the setting of break predicate flags.
Figure 13:
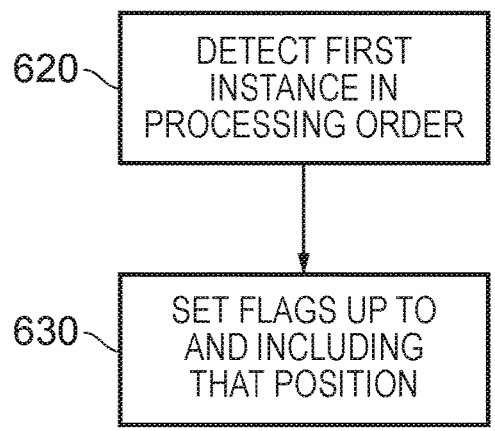

FIG. 13 schematically illustrates a "break after" operation. Here the term "after" means that the break operation is carried out after a vector processing instruction in the loop operation. So, the instruction before the break condition is applied should still be performed in respect of the particular data item which triggered the break.

An upper line of FIG. 13 represents a set of results 600 from a vector processing operation, and in this example the presence of a 1 in the results is taken to be a result which (under the break condition) indicates that the loop operation should be terminated or broken.

A second row 610 of FIG. 13 schematically represents a set of predicate flags generated by the "break after" operation. Referring to the flow chart steps of FIG. 13, working in the processing order 130, the break after operation detects the first instance of a result (such as the result 602) indicative of the need to break the loop, and sets the predicate flags to "active" at a step 630 up to and including that position in the order 130. Any subsequent predicate flags are set to inactive. A condition flag prompting breaking of the loop is also set.

Figure 14:
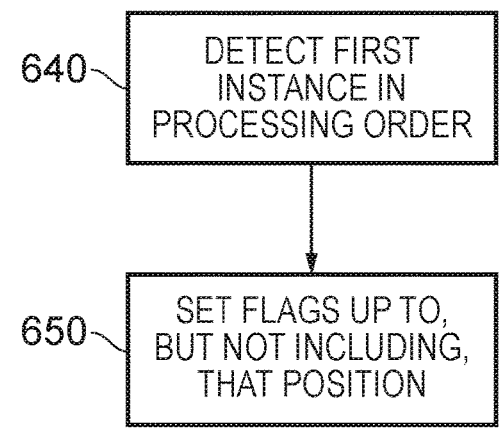

Similarly, FIG. 14 schematically represents a "break before" operation, which relates to a break detection before a vector processing instruction to be carried out. Here, the data item which triggered the loop break should not be processed by the subsequent vector processing instruction. Therefore a set of predicate flags 612 is generated by detecting, at a step 640 the first instance of a result 602 in the processing order 130 indicative of a break, and, at a step 650, setting the predicate flags to "active" up to, but not including, that position. Any subsequent predicate flags are set to inactive. Again, a condition flag is also set.

The set of predicate flags produced in this way ensure that in respect of the currently handled data vector, those data items in the data item processing order 110 which should be processed before the break is handled are indeed processed, given that their predicate flags are set to "active". Those data items in the order 110 which, had the data items been processed individually, would have fallen after the break condition is tested, are not processed by virtue of their predicate flags being set to "inactive".

A further aspect of handling a break condition in a vectorised loop, however, is to exit the loop before processing that data vector. This process will be discussed with reference to FIGS. 15 and 16.

Figure 15:
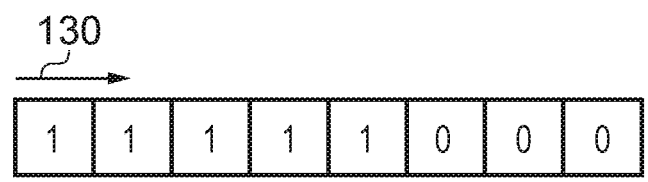
FIG. 15 schematically illustrates a set of break predicate flags.

FIG. 15 schematically illustrates a set of break predicate flags resulting from a "break before" operation, which in this example comprises a set of eight flags for a vector length $V_L$ of 8. The first five predicate flags in the order 130 are set to active and the remaining three predicate flags are set to inactive. This indicates that a break condition has been detected and that five of the eight data items in the current data vector are to be processed before the break condition applies (for example, under the control of a condition flag).

Figure 16:
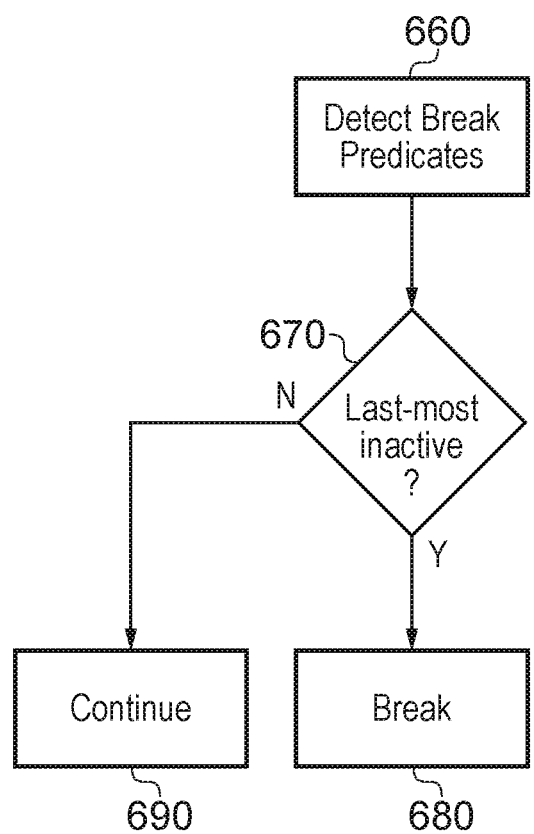
FIG. 16 is a schematic flowchart illustrating the handling of a break condition.

Referring to FIG. 16, at a step 660 the break predicates of FIG. 15 relating to the "break before" are detected and a detection is made at a step 670 as to whether the last-most predicate flag (in the order 130) is inactive (although one or more last-most flags could be used). If the outcome is yes then the loop is broken at a step 680 and the looped operation is terminated, for example by setting one or more condition flags as discussed above. If the answer is no, however, then the looped operation is continued at a step 690. This provides an example of the processing circuitry being configured to execute a looped operation and to generate the data set as a test of continued execution of the looped operation; and the processing circuitry being configured to terminate the looped operation if one or more last-most predicate flags of the set applicable to the current data vector are inactive.

Considering the unrolled loop discussed with reference to FIG. 7, if the break predicates of the type discussed in connection with FIGS. 15 and 16 are used, an issue could arise if a break condition were detected in one of the multiple data vectors being handled within a single loop iteration. So, the following discussion applies to an arrangement using processing circuitry to apply a vector processing instruction to data vectors having a data vector processing order, each data vector comprising a plurality of data items having a data item order, the processing circuitry selectively applying the vector processing instruction to data items at positions within a data vector according to the states of a set of respective predicate flags associated with the positions, an active predicate flag indicating that the vector processing instruction should be applied, and an inactive predicate flag indicating that the vector processing instruction should not be applied.

For example, consider the detection of a break condition at one of the data item positions in vector 2 of FIG. 7 (the data vector handled at the step 440). The break processing discussed above would set all of the break predicates for vector 1 (preceding the vector in which the break was detected) to active, and would set some of the break predicates in vector 2 to active, with subsequent ones set to inactive. But the break processing (as described so far) would not detect that vectors 3 and 4 should not now be processed at all, because of the break detected at vector 2.

A further measure to address this issue is to make use of a so-called a propagation instruction which, when executed, derives a set of predicate flags applicable to a current data vector in dependence upon a set of predicate flags applicable to a preceding data vector in the data vector processing order, so that when one or more last-most predicate flags of the set applicable to the preceding data vector are inactive, the propagation instruction causes all of the predicate flags in the set applicable to the current data vector to be inactive.

Particular examples (including particular bit values shown in the drawings, which are just to assist the explanation and are simply examples) will be discussed below with reference to FIGS. 17 and 18. But in general terms, in the example just given the propagation instruction would propagate the detected break in vector 2 into the break predicates associated with vectors 3 and 4 (or however many further vectors were being processed in that loop iteration) by setting those break predicates to "inactive".

This arrangement has two potentially useful effects. A first is to inhibit the operation of the unrolled looped processing on data vectors following the first one in which a break was detected. The other is to allow the same test as before to be used to detect a break, namely the test at the step 670 in FIG. 16, as the propagation of predicate flags will mean that if a break is detected anywhere in the set of data vectors being handled by the unrolled loop, the last-most predicate flag (in the processing order) of the last-most data vector (in the data vector processing order) will be inactive and so control can be passed to the step 680.

Figure 17:
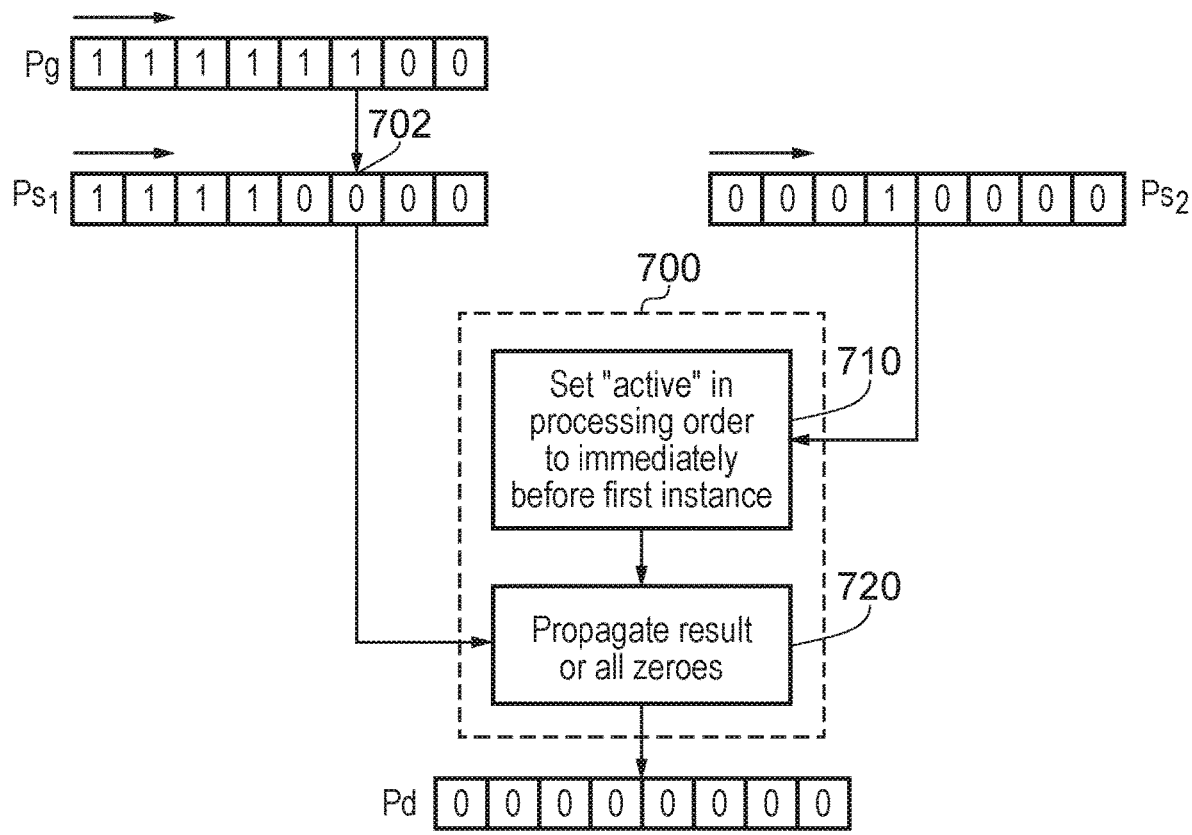
FIG. 17 schematically illustrates an example of a propagation instruction.
Figure 18:
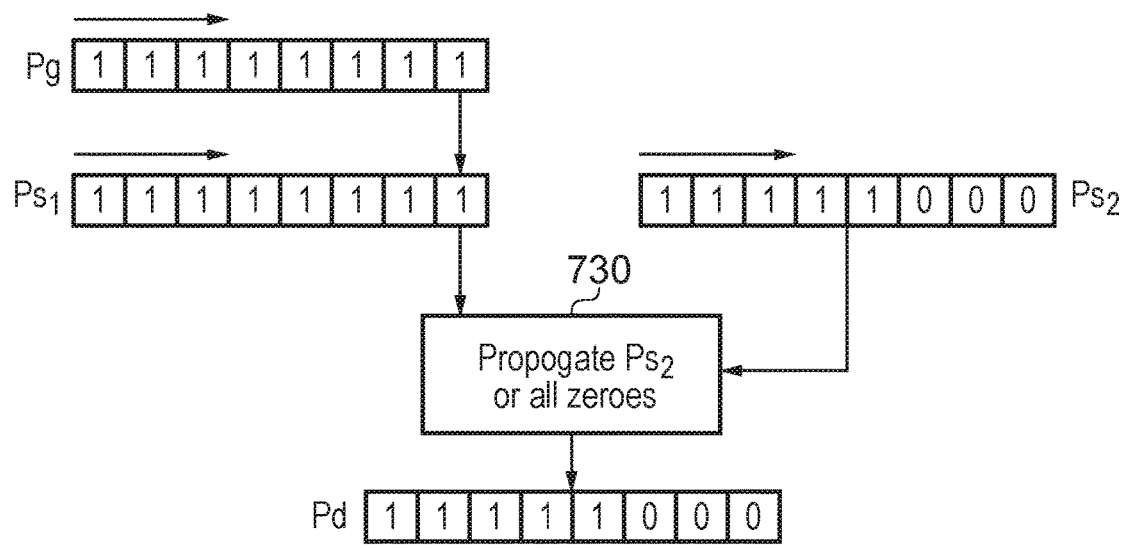
FIG. 18 schematically illustrates another example of a propagation instruction.

In each of FIGS. 17 and 18, the output of the process is a respective "destination" set of predicates, Pd. This represents a set of break predicates applicable to a current data vector (for example, vector 3 in FIG. 7), which propagate the break predicates derived in respect of a preceding data vector (for example, vector 2 in FIG. 7). Note that the process is carried out successively for each instance of propagation in the data vector order 140, so that a Pd predicate set for vector 2 is derived by propagating the break predicates for vector 1, then a Pd set for vector 3 is derived by propagating the results for vector 2, then a Pd for vector 4 is derived by propagation of the results from vector 3.

The inputs to the processes vary slightly between FIGS. 17 and 18.

In the case of FIG. 17, the inputs include a set of predicates $P_{S1}$ relating to break detection in respect of a preceding data vector of the set being handled in a single loop iteration. This could be: (a) a set of break predicates generated by a "break before" operation with respect to a first data vector of the set of data vectors being handled in a single loop iteration; or (b) a set of break predicates generated by the propagation instruction acting in respect of the preceding data vector (in the data vector processing order 140) of the set of data vectors being handled in a single loop iteration; or (c) in the case of the first data vector of the set, a set of break predicates (all active), allowing the same propagation instruction to be used even for the first data vector of the set of data vectors being handled in a single loop iteration. (An alternative for the first vector is simply to use a break operation, and then use the propagation instructions for subsequent vectors).

Further inputs to the process of FIG. 17 are: a general set of predicates Pg, representing (for example) the results of the loop control processing discussed above; and a data set $P_{S2}$ representing the outcome of a vector processing operation of the type generated at the step 560 and provided as the input 600 to the processes of FIGS. 13 and 14.

The operations relating to the propagation instruction are indicated by a broken line box 700 of FIG. 17, and include: a step 710 (which corresponds to the steps 620, 640 of FIGS. 13 and 14) in which break predicates are set to "active" in the processing order up to immediately before the first instance of the break condition being detected (which in turn means that they are all set to "active" if the break condition is not detected in the data set $P_{S2}$), and a step 720 at which either the result of the step 710 is provided as the output set Pd, or a set of all zeroes (all inactive break predicates) is provided as the output set Pd.

The determining factor as to which of these outputs is provided by the step 720 is whether the last-most break predicate (in the order 130) in the set $P_{S1}$ is set to active. If it is, then this indicates that the break condition was not detected in respect of the preceding data vector, and that the outcome of the step 710 may be validly used as a set of break predicates in respect of the current data vector. But if the last-most break predicate in the set $P_{S1}$ is set to inactive, this indicates that a break condition was detected in respect of the preceding data vector of the set of data vectors being handled by the loop iteration, which in turn means that none of the data items of the current data vector should be processed. So in this latter instance, an output Pd of all zeroes (all inactive) is provided.

The step 710 provides an example of in which the propagation instruction, when executed, generating the initial states of the set of predicate flags applicable to the current data vector from a data set having a data set entry corresponding to each predicate flag. For example, each data set entry may have multiple possible states; and the propagation instruction, when executed, can generate the initial states of the set of predicate flags applicable to the current data vector so that the predicate flags are set to an active state up to a predicate flag immediately preceding a first occurrence, in the data item order, of a particular state of the corresponding data set entry. The data set $P_{S2}$ in FIG. 17 provides an example of the processing circuitry being configured to generate the data set as an output of a vector processing operation (as in the example of FIG. 14 discussed above).

Note that in some example embodiments, the predicates $P_{S1}$ are gated by the general predicate Pg, so that the last-most break predicate in the set $P_{S1}$ is taken by the execution of the propagation instruction to be the last-most break predicate for which the corresponding general predicate is set to "active" (shown as an example predicate 702 in FIG. 17). Therefore the reference to a set of predicate flags applicable to a preceding data vector in the data vector processing order could refer in some examples to all of the predicate flags in the set $P_{S1}$, or in other examples to those of the predicate flags in the set $P_{S1}$ which correspond to active predicate flags in the general predicate Pg. These latter arrangements are examples of the propagation instruction being responsive to a further set of predicate flags (such as Pg) defining which of the predicate flags associated with the preceding data vector are applicable to that preceding data vector.

The propagation instruction of FIG. 17 therefore includes the functionality of the "break before" process discussed above with the propagation of break predicates to a next data vector in the set being handled in a loop iteration of an unrolled loop. Note that the steps 710, 720 are shown as separate steps for the purposes of this description, but could be implemented as part of a single overall logical operation at execution of the propagation instruction.

A further example of a propagation instruction is shown schematically in FIG. 18. Here, the output Pd and the inputs $P_{S1}$, Pg are as described with reference to FIG. 17. But the input $P_{S2}$ is in fact a set of break predicates generated by a "break before" instruction or operation in respect of the current data vector. So, the input $P_{S2}$ represents the output of the process of FIG. 14 discussed above. This demonstrates that in some examples, the propagation instruction could be implemented as a separate instruction to the "break before" instruction, whereas in FIG. 17 it was demonstrated that a single instruction could provide the functionality of the break before and predicate propagation processes.

Taking the predicate set $P_{S2}$ as an input, the processing 730 carried out by the execution of the propagation instruction is similar to that described as the step 720 of FIG. 17, in that either the predicate set $P_{S2}$ is provided as the output set Pd, or a set of all zeroes (all inactive break predicates) is provided as the output set Pd. Once again, the determining factor as to which of these outputs is provided by the step 730 is whether the last-most break predicate (in the order 130) in the set $P_{S1}$ is set to active. If it is, then this indicates that the break condition was not detected in respect of the preceding data vector, and that the predicate set $P_{S2}$ may be validly used as a set of break predicates in respect of the current data vector. But if the last-most break predicate in the set $P_{S1}$ is set to inactive, this indicates that a break condition was detected in respect of the preceding data vector of the set of data vectors being handled by the loop iteration, which in turn means that none of the data items of the current data vector should be processed. So in this latter instance, an output Pd of all zeroes (all inactive) is provided.

The arrangement of FIG. 18, and the step 720 of FIG. 17, provide examples in which the propagation instruction is responsive to initial states of the set of predicate flags applicable to the current data vector; and when all of the predicate flags of the set applicable to the preceding data vector are active, the propagation instruction, when executed, derives the predicate flags in the set applicable to the current data vector from their respective initial states.

The propagation instruction is not only relevant to break situations, but can also be relevant where flags or other information needs to be propagated from one data vector to another in (for example) an unrolled loop or other situation. Another example occurs in the context of speculative memory accesses which can be used within an unrolled loop or other situation to access memory locations based on multiple data vectors before the processing has been completed in respect of a first data vector (in the order 140). Speculative access is used so as to avoid generating memory faults, but in some instances it can be useful to detect a first faulting data item (in the order 110) and not process data items after that (in the order 110) until the fault has been addressed. A first faulting flag can therefore be detected in a similar manner to a break condition and the results propagated as discussed above, in order to inhibit subsequent (in the order 110) operations until or unless the first fault has been dealt with.

Figure 19:
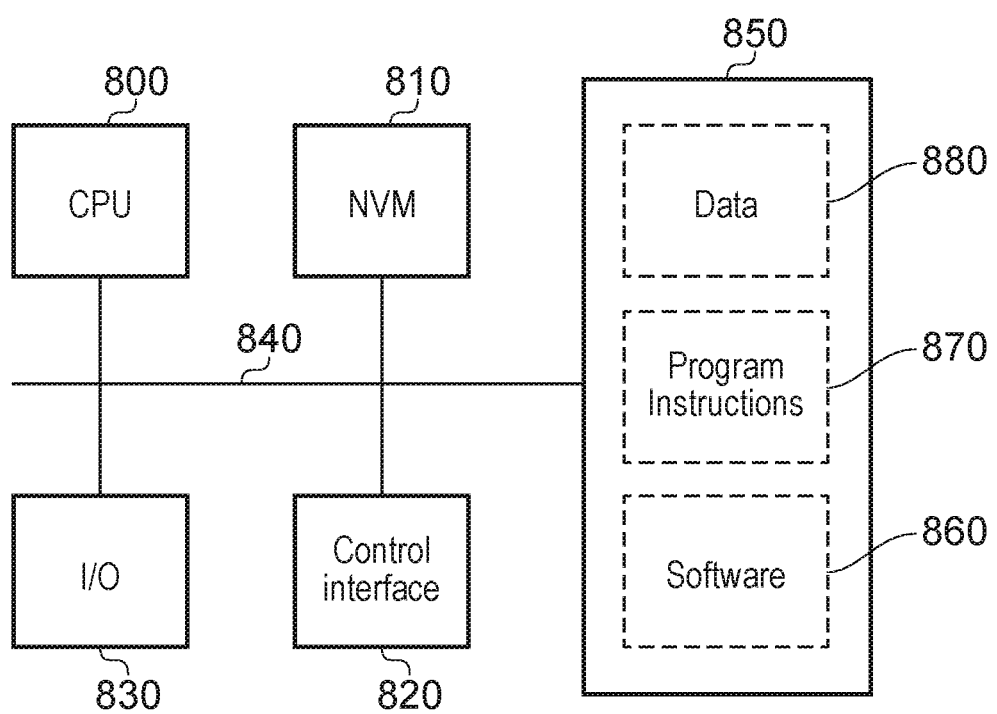
FIG. 19 schematically illustrates a virtual machine.

FIG. 19 schematically illustrates a virtual machine by which some or all of the functionality discussed above is provided. The virtual machine comprises a central processing unit (CPU) as an example of data processing circuitry 800, a non volatile memory 810, a control interface 820 and an input/output (IO) interface 830, all interconnected by a bus arrangement 840. A random access memory (RAM) 850 stores program instructions providing software 860 to control operations of the CPU 800. Under the control of the software 860, the CPU 800 provides or emulates the functionality of one or more of the processing instructions discussed above. The RAM 850 also stores program instructions 870 and data 880, where the program instructions 870 are instructions applicable to the processor 20 of FIG. 1 and which are interpreted, emulated or otherwise executed by the CPU 800 acting as a virtual machine. The data 880 is data corresponding to the data 32 of FIG. 1 to be acted upon by (virtual) execution of the program instructions 870. The arrangement of FIG. 19 therefore provides an example of a virtual machine comprising a data processor (such as the CPU 800) to execute a computer program comprising machine readable instructions (for example the software 860), in which execution of the computer program causes the data processor to operate as a data processing apparatus of the type described above. Example embodiments are also represented by computer software which, when executed by a computer, causes the computer to carry out one or more of the techniques described above, and by a non-transitory machine readable storage medium which stores such computer software.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the present techniques have been described in detail herein with reference to the accompanying drawings, it is to be understood that the present techniques are not limited to those precise embodiments, and that various changes, additions and modifications can be effected therein by one skilled in the art without departing from the scope and spirit of the techniques as defined by the appended claims. For example, various combinations of the features of the dependent claims could be made with the features of the independent claims without departing from the scope of the present techniques.

The invention claimed is:

1. Data processing apparatus comprising:
processing circuitry to selectively apply a vector processing operation to data items at positions within data vectors according to the states of a set of respective predicate flags associated with the positions, the data vectors having a data vector processing order, each data vector comprising a plurality of data items having a data item order, the processing circuitry comprising:
instruction decoder circuitry to decode program instructions; and
instruction processing circuitry to execute instructions decoded by the instruction decoder circuitry;
wherein the instruction decoder circuitry is responsive to a propagation instruction to control the instruction processing circuitry to derive a set of predicate flags applicable to a current data vector in dependence upon a set of predicate flags applicable to a preceding data vector in the data vector processing order, wherein when one or more last-most predicate flags of the set applicable to the preceding data vector are inactive but one or more predicate flags of the set applicable to the preceding data vector are active, all of the derived predicate flags in the set applicable to the current data vector are inactive.

2. Apparatus according to claim 1, in which:
the instruction decoder circuitry is responsive to the propagation instruction to control the instruction processing circuitry to respond to initial states of the set of predicate flags applicable to the current data vector, wherein when one or more last-most predicate flags of the set applicable to the preceding data vector are active, the derived predicate flags in the set applicable to the current data vector are derived from their respective initial states.

3. Apparatus according to claim 2, in which:
the instruction decoder circuitry is responsive to the propagation instruction to control the instruction processing circuitry to respond to a further set of predicate flags defining which of the predicate flags associated with the preceding data vector are applicable to that preceding data vector.

4. Apparatus according to claim 1, in which the instruction decoder circuitry is responsive to the propagation instruction to control the instruction processing circuitry to generate the initial states of the set of predicate flags applicable to the current data vector from a data set having a data set entry corresponding to each predicate flag.

5. Apparatus according to claim 4, in which:
each data set entry has multiple possible states; and
the instruction decoder circuitry is responsive to the propagation instruction to control the instruction processing circuitry to generate the initial states of the set of predicate flags applicable to the current data vector, wherein the predicate flags are set to an active state up to a predicate flag immediately preceding a first occurrence, in the data item order, of a particular state of the corresponding data set entry.

6. Apparatus according to claim 5, in which the processing circuitry is configured to generate the data set as an output of a vector processing operation.

7. Apparatus according to claim 1, in which:
the processing circuitry is configured to execute a looped operation and to generate the data set as a test of continued execution of the looped operation; and
the processing circuitry is configured to terminate the looped operation if one or more last-most predicate flags of the set applicable to the current data vector are inactive.

8. Apparatus according to claim 1, in which an active predicate flag indicates that the vector processing instruction should be applied, and an inactive predicate flag indicates that the vector processing instruction should not be applied.

9. Data processing apparatus comprising:
means for selectively applying a vector processing operation to data items at positions within data vectors according to the states of a set of respective predicate flags associated with the positions, the data vectors having a data vector processing order, each data vector comprising a plurality of data items having a data item order, the means for applying comprising:
means for decoding program instructions; and
means for executing instructions decoded by the means for decoding;
the means for decoding being responsive to a propagation instruction to control the means for executing to derive a set of predicate flags applicable to a current data vector in dependence upon a set of predicate flags applicable to a preceding data vector in the data vector processing order, wherein when one or more last-most predicate flags of the set applicable to the preceding data vector are inactive but one or more predicate flags of the set applicable to the preceding data vector are active, all of the derived predicate flags in the set applicable to the current data vector are inactive.

10. A data processing method comprising
selectively applying a vector processing operation to data items at positions within data vectors according to the states of a set of respective predicate flags associated with the positions, the data vectors having a data vector processing order, each data vector comprising a plurality of data items having a data item order, the applying comprising:
decoding program instructions; and
executing instructions decoded by the decoding step;
the decoding step being responsive to a propagation instruction to control the executing step to derive a set of predicate flags applicable to a current data vector in dependence upon a set of predicate flags applicable to a preceding data vector in the data vector processing order, wherein when one or more last-most predicate flags of the set applicable to the preceding data vector are inactive but one or more predicate flags of the set applicable to the preceding data vector are active, all of the derived predicate flags in the set applicable to the current data vector are inactive.

11. A non-transitory machine readable storage medium which stores computer software which, when executed by a computer, causes the computer to carry out the method of claim 10.

12. A virtual machine comprising a data processor to execute a computer program comprising machine readable instructions, in which execution of the computer program causes the data processor to operate as a data processing apparatus comprising:
processing circuitry to selectively apply a vector processing operation to data items at positions within data vectors according to the states of a set of respective predicate flags associated with the positions, the data vectors having a data vector processing order, each data vector comprising a plurality of data items having a data item order, the processing circuitry comprising:
instruction decoder circuitry to decode program instructions; and
instruction processing circuitry to execute instructions decoded by the instruction decoder circuitry;
wherein the instruction decoder circuitry is responsive to a propagation instruction to control the instruction processing circuitry to derive a set of predicate flags applicable to a current data vector in dependence upon a set of predicate flags applicable to a preceding data vector in the data vector processing order, wherein when one or more last-most predicate flags of the set applicable to the preceding data vector are inactive but one or more predicate flags of the set applicable to the preceding data vector are active, all of the derived predicate flags in the set applicable to the current data vector are inactive.

* * * * *